United States Patent [19]

Louie et al.

[11] Patent Number: 4,673,847
[45] Date of Patent: Jun. 16, 1987

[54] COLOR MONITOR WITH IMPROVED DIGITAL CONVERGENCE

[75] Inventors: Chuen W. Louie, Richmond Hill; Darrell D. Roelofs, Huntington Station; John L. Volk, Eatons Neck, all of N.Y.; Arthur L. Romeo, Los Angeles, Calif.

[73] Assignee: Hazeltine Corporation, Commack, N.Y.

[21] Appl. No.: 722,960

[22] Filed: Apr. 12, 1985

[51] Int. Cl.⁴ .............................................. H01J 29/70
[52] U.S. Cl. .................................... 315/368; 315/367
[58] Field of Search ................................. 315/368, 367

[56] References Cited

U.S. PATENT DOCUMENTS 4,203,054  5/1980  Sowter ................................. 315/368
4,401,922  8/1983  Kamata et al. ....................... 315/368
4,422,019  12/1983  Meyer ................................. 315/368
4,524,307  6/1985  Wahlquist ............................ 315/368

Primary Examiner—Theodore M. Blum
Assistant Examiner—Gregory C. Issing
Attorney, Agent, or Firm—E. A. Onders; F. R. Agovino

[57] ABSTRACT

A color video monitor is disclosed which includes improved digital convergence using a plurality of memory means in which vertical convergence correction values are stored, one memory each for red, green, blue and lateral blue convergence values. Interpolation means provide additional values between the points stored in memory such that a smooth transition between successive lines of the display is achieved. The correction values stored in the memories are generated by means of a high-order polynomial function.

12 Claims, 4 Drawing Figures

COLOR MONITOR WITH IMPROVED DIGITAL CONVERGENCE

BACKGROUND OF THE INVENTION

The present invention relates generally to high resolution and high chromaticity color monitors and televisions. More particularly, the present invention relates to a novel digital system for providing the color convergence function for color monitors and televisions.

In many military and industrial raster-scanned monitor applications, it has been found to be beneficial to display the monitored information on a video screen as color-coded graphics and alphanumeric data. While there are definite advantages to displaying color-coded data in military command and industrial control situations, such advantages could not heretofore be realized because, owing to the amount of data to be displayed on the screen, color monitor displays were not capable of sufficient resolution and color purity.

In fact, heretofore, monochrome video monitors actually outperformed conventional color displays in such areas as sharpness and legibility of data over the entire display surface; color control, convergence and reproducibility; adaptability to the human operator; immunity to shock and vibration; and performance stability over time.

In order to provide for the effective display of multi-colored data and graphics on a color monitor, the monitor must produce very high true visual display resolution and accurately reproducible colors. The colors produced must be free of visible jitter, drift and misconvergence, on the entire display surface of the monitor screen, including the edges and corners. In such manner, the display parameters are controlled to optimize the ability of the operator to read the color-coded display data. In addition, such accuracy of display must frequently be maintained under adverse environmental operating conditions.

The achievement of such characteristics provides high legibility and accurate reading of high density display data typically found in military command and control applications. In such applications, as well as various other industrial and transportation control enterprises, characters, complex symbols and other details must be small to minimize the overlapping and unreadability of the data. The display quality of monitors built to achieve the above characteristics equals or surpasses that of the best monochrome monitors of comparable size, while providing the additional benefits of color-coding.

Military command and control systems are increasingly required to cope with dense target environments requiring rapid processing, display and decision-making on large amounts of data. The display system must present the data to the operator in a form which enables him to quickly and accurately identify and track items of interest amid the clutter and overlapping of many or similar-appearing items. Further, such items are constantly changing positions, with the frequent, random appearance of new items, usually near the edges of the display.

Color-coding of the display data can improve operator accuracy, shorten his reaction time and lessen his fatigue, serving as a highlighter and an aid to discrimination of similar-appearing data in a dense display. Such benefits have encouraged increased use of color displays, both in military applications, and also civilian activities, such as air traffic control systems.

Prior to the present invention, several parameters of color display performance have been less than satisfactory than those of monochrome displays for such usage. The present invention has resulted in significant improvements that are necessary in order to achieve any benefit from the addition of color-coding. Such improvements are in the areas of legibility, that is, the crispness and readability of the data; chromaticity, that is, color control for optimum human perception and readability; and color convergence, that is, the coincidence of position of primary colors and performance stability over time. The color monitor described generally, and the convergence circuit specifically described herein, achieve such performance goals.

The digital convergence circuitry of the present invention is designed to provide a highly legible display, as well as to display selected colors controlled to close tolerances. The three primary colors, red, green and blue, are converged to within less than a line thickness. That is, misconvergence of approximately 0.015 inch for an 0.018 inch line thickness is achieved. Unlike prior art color monitors, the present invention achieves such performance over the entire display area, not just a center "quality circle" area of the display.

The above-described legibility is achieved according to the present invention by providing a uniform spot size of 0.015 inch without Moire effects and a color misconvergence of less than approximately 0.012 inch over the entire display surface, including the edges. Such values are achieved regardless of operator settings of the brightness and contrast controls. The effective resolution of the display is approximately 750 H × 1000 V, or 750,000 pixels, on a nominal 11 inch H × 14 inch V display.

Conventional monitors do not meet such legibility criteria since typical spot size averages about 0.025 inch and misconvergence can be up to 0.040 inch over the entire display surface. Typical specifications for those monitors which describe their resolution as 1280 H × 1024 V actually indicate the addressability or number of spot positions, rather than resolution (visual discrimination of adjacent spots). In reality, the true resolution of such monitors is about 600 H × 450 V, or 270,000 pixels, or about one-third of that achieved by the color monitor of the present invention. Furthermore, misconvergence can further degrade that resolution and hence the legibility near the periphery of the display.

SUMMARY AND OBJECT OF THE INVENTION

In view of the foregoing, it should be apparent that there still exists a need in the art for a color monitor having a highly accurate digital convergence circuit such that the display exhibits a high degree of legibility and color resolution. It is, therefore, a primary object of this invention to provide a color monitor having a convergence circuit resulting in a display which exhibits a high degree of legibility and color resolution and which has particular application in military command and control environments, as well as in civilian environments.

More particularly, it is an object of the present invention to provide a color monitor having color convergence circuitry capable of providing a highly accurate and precise color convergence function such that the misconvergence is approximately 0.012 inch over its entire display.

Yet another object of the present invention is to provide a color monitor having a color convergence circuit constructed of digital circuit component such that it can operate accurately under adverse environmental conditions.

Yet another object of the present invention to provide a color monitor having a color convergence circuit which utilitzes a 3 bit code to provide up to eight different colors, including black, on its display.

It is still yet another object of the present invention to provide a color monitor having a color convergence circuit which utilizes color convergence correction values stored in memory to produce a display having an extremely low misconvergence.

It is a further object of the present invention to provide a color monitor which uses a color convergence circuit having color convergence correction values calculated by means of a highly accurate fourth-order polynomial equation.

Briefly described, these and other objects of the present invention are accomplished by providing a color monitor having a digital color convergence circuit which generates highly accurate convergence waveforms by means of a high-order polynomial equation. Those waveforms, which are digitally generated and then converted to analog form, are applied to the convergence coils around the neck of the CRT. Such waveforms and coils further include blue lateral convergence to achieve a high degree of convergence precision. Convergence correction factors are calculated by the circuitry by reference to stored values in an on-board memory, which may be of the EPROM type. Those stored values were calculated by means of a high-order polynomial equation to be described in greater detail hereinafter.

The digital convergence circuit comprises a vertical parabola and sweep generator, red, green and blue convergence generators, and a blue lateral convergence generator. The vertical sweep signal is developed digitally by a D/A converter whose input reflects the desired sweep amplitude at the D/A output. The input to the D/A converter is generated by an address counter whose output is modified stored EPROM data used for centering the vertical sweep. In order to achieve a high degree of convergence, an "S" correction is added to the vertical sweep, by means of a second D/A converter. The output of that second D/A converter is applied to the sweep D/A converter to provide the vertical "S" correction.

The cutput of the "S" correction D/A converter is established by an EPROM data output. The EPROM address data is generated by the same address counter used to generate the vertical sweep. A third D/A converter, connected to the output of the "S" correction EPROM, produces the vertical parabola (VPAR) signal.

The digital convergence circuitry of the present invention is designed to be used with a standard three gun CRT color tube in which the axes of the red and green guns are oriented at 120° apart from each other. Such tubes require four convergence driver signals, red, green and blue, and blue lateral signals.

The red convergence driver signal is used to adjust the position of the red dot along the red diagonal. The green convergence driver signal is used to adjust the green dot position along the green diagonal, which is 120° away from the red diagonal. The blue convergence driver signal adjusts the blue dot position along the vertical line. Finally, the blue lateral driver signal is used to adjust the blue dot position along the horizontal line.

DETAILED DESCRIPTION OF THE PREFERRED EMBODIMENT

Figure 1:
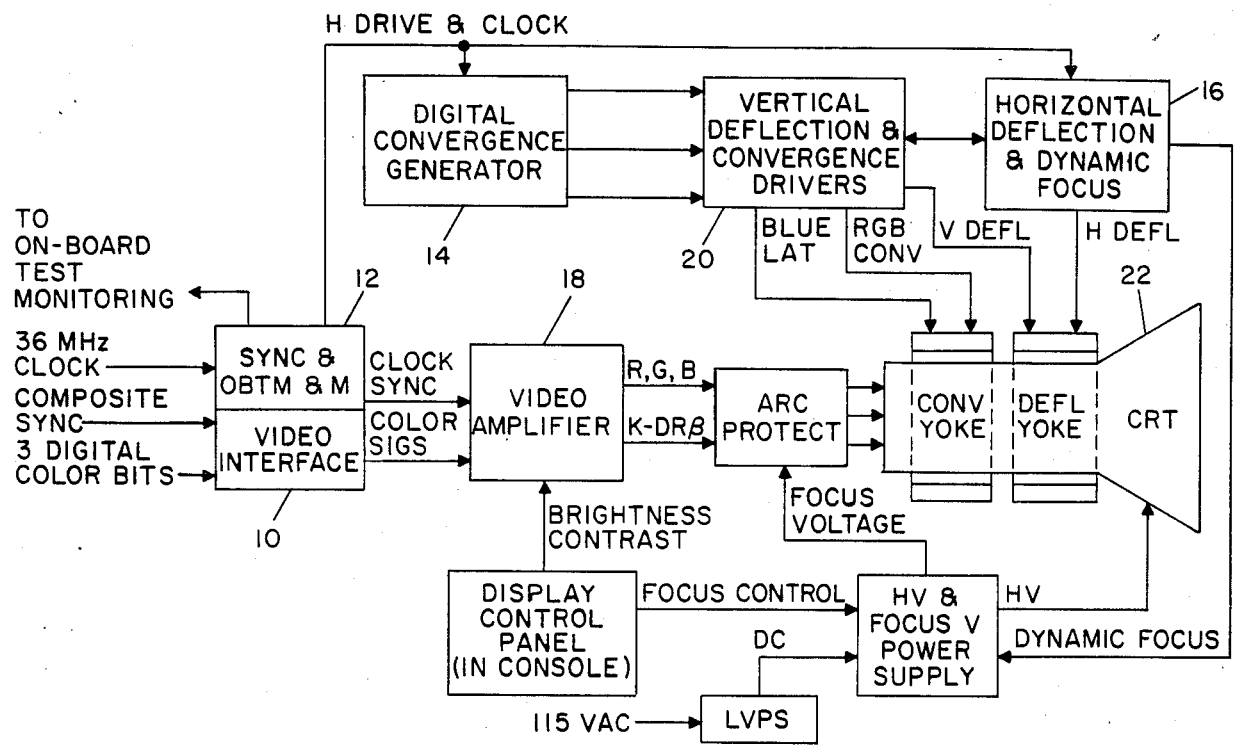
FIG. 1 is a block diagram of the circuitry of the color monitor of the present invention.

At the outset, it should be pointed out that circuits which perform the functions indicated in the blocks of FIG. 1 are known to those of ordinary skill in the art, and others, for use in color monitors. Thus, only certain portions of that circuitry have been described in detail herein, so as not to unnecessarily obscure the present invention.

Referring now to the various drawing figures, in which like elements are indicated by like reference numerals throughout, there is shown in FIG. 1, in schematic block diagram form, the color monitor of the present invention. The color monitor receives, through its video interface and synchronization and on-board test circuits 10 and 12, respectively, a 36 MHz clock signal, composite sync signal and a three digital bit color signal, and thus is capable of reproducing eight different colors. A horizontal drive and clock signal is provided to the digital convergence generator 14 and also to the horizontal deflection and dynamic focus circuit 16.

The general functioning of the remaining circuitry shown in FIG. 1 is beleived to be known. However, the video amplifier circuitry 18 is the subject of a co-pending U.S. patent application, Ser. No. 06/722,959, filed concurrently herewith and commonly assigned to the assignee of this application. The disclosure of that patent application is hereby incorporated as if set forth in full herein.

Figure 2:
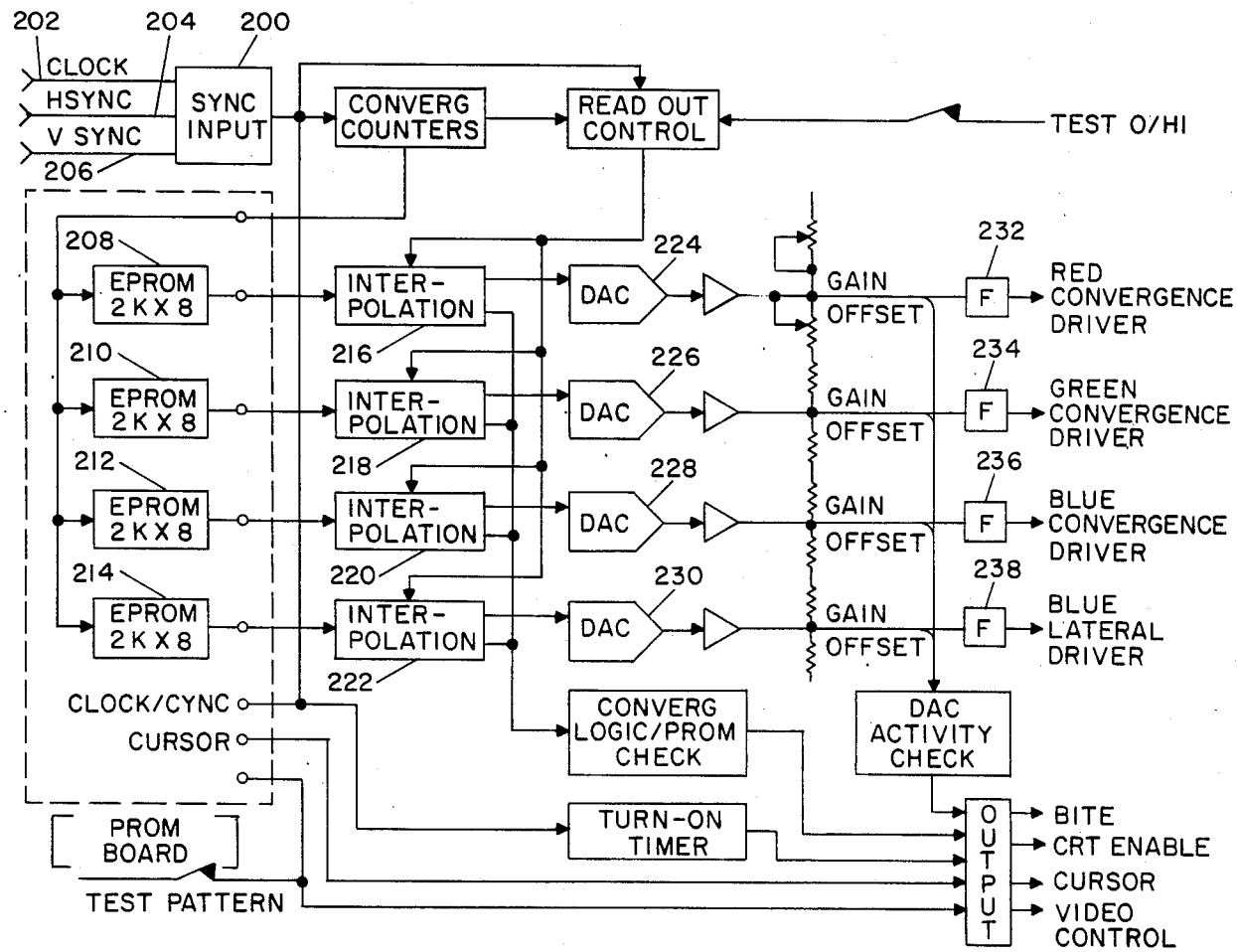
FIG. 2 is a block diagram of the digital color convergence circuitry of the present invention.

FIG. 2 illustrates, in block diagram form, the circuitry of the digital convergence generator 14. The SYNC input receives three signals from elsewhere in the color monitor. These signals consist of a 9 MHz clock signal 202 derived from the 36 MHz pixel clock, a horizontal sync pulse 204 and a vertical sync pulse 206. The 9 MHz clock and the horizontal sync signals are synchronized with each other and may be adjusted in time with respect to the horizontal sync signal used in the deflection circuits 16 and 20 shown in FIG. 1. The adjustment provides a one pixel resolution and is used to align the convergence waveform with the deflection waveform.

Four EPROMs 208, 210, 212 and 214, contain a matrix of 63 by 30 vertical convergence values which are generated as described in more detail hereinafter. However, the effective matrix stored in those EPROMs is actually 63 by 480 because of the use of the interpolators 216, 218, 220 and 222. Since there are 30 basic vertical convergence values and 480 lines of information, each vertical convergence value is used to converge 16 lines of information. Thereafter, the next vertical convergence value is used to converge the next 16 lines of information.

The interpolators 216, 218, 220 and 222 interpolate from one vertical convergence value to the next such that a fairly smooth convergence change from line to line occurs. For example, if point (1,1) has a convergence value of 216 volts and point (17,1), which is 16 lines below point (1,1), has a convergence value of 190 volts, then point (2,1) would have a value of 215 volts, point (7,1) would be 210 volts and point (16,1) would be 191 vertical volts. That is due to the fact that interpolators 216, 218, 220 and 222 interpolate between the successive vertical convergence values so that a smooth convergence from line to line is achieved.

Similarly, smoothing filters 232, 234, 236 and 238 are fed the analog driver signals from the digital-to-analog converters 224, 226, 228 and 230, to smooth the voltage values between successive pixels so that a smooth transition of convergence values between successive pixels during horizontal scanning is also achieved.

Figure 3:
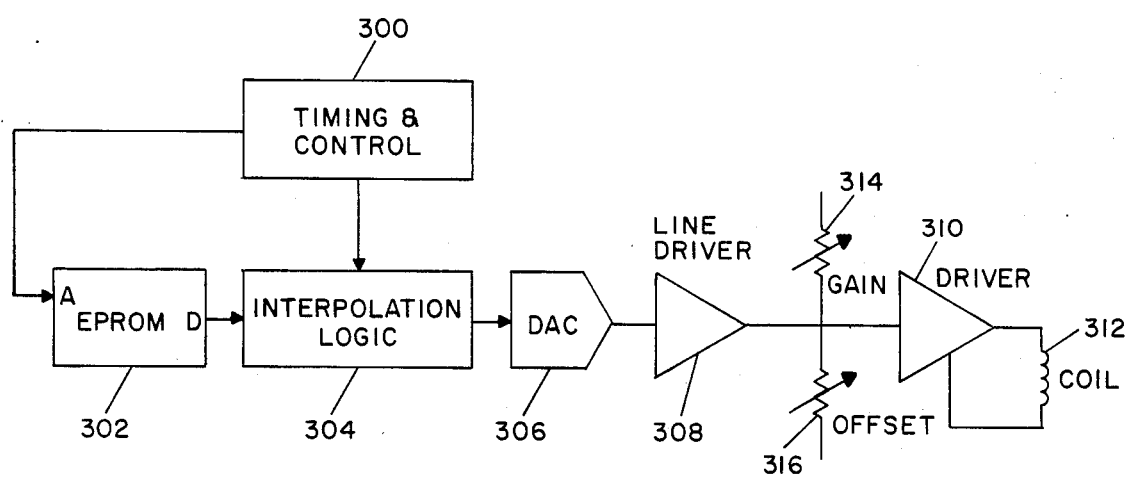
FIG. 3 is an operational block diagram of one of the four color convergence circuits contained in the digital color convergence circuitry of FIG. 2.

A simplified diagram illustrating the operation of the digital convergence circuitry is shown in FIG. 3. The timing and control circuitry 300 initiates the generation of a convergence value for each waveform by reading an initial value from the EPROM 302. It should be understood that, as shown in FIG. 2, there are four such FIG. 3 circuits incorporated in the digital convergence circuitry 14 of the color monitor. One "channel" each for red, green and blue convergence, and the fourth for blue lateral convergence. Thus, as shown in FIG. 2, each "channel" utilizes a unique EPROM of 2 K bytes.

The eight bit convergence value output from EPROM 302 is applied to the interpolation logic circuitry 304, which may consist of arithmetic logic units. The interpolation logic circuitry 304 also includes a RAM 400, (shown in FIG. 4), in which a data file is stored. The data file is also inputted to the ALU's and the resultant ALU outputs are latched and applied to a digital-to-analog converter 306. The digital-to-analog converter 306 develops an associated analog convergence voltage which is applied, through drivers 308 and 310, to the appropriate convergence coil 312 on the CRT 22. Each convergence coil 312 (only one is shown for simplicity), develops a magnetic field that converges the three CRT cathode color outputs to ensure that the three colors impinge at the proper dot location on the screen phosphor of the CRT 22. Potentiometers 314 and 316 are provided to perform convergence digital-to-analog output waveform gain and offset functions, respectively.

Figure 4:
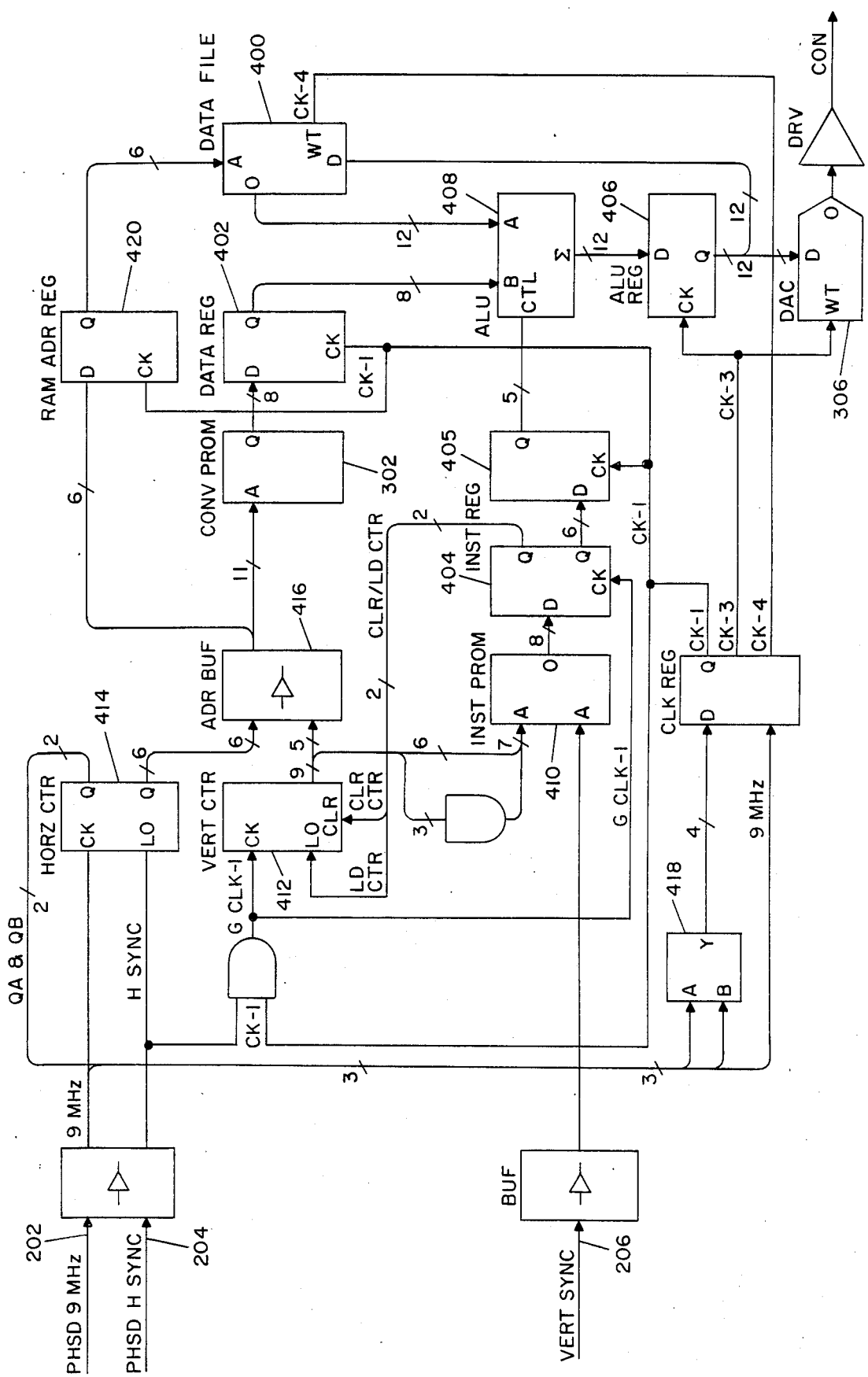
FIG. 4 is an electrical block diagram of the digital color convergence circuit used in the color monitor of the present invention.

In FIG. 4, each convergence waveform is generated by reading an intial value from the respective convergence EPROM 302 for each of 63 data points along the horizontal direction, 53 in active time and 10 in blanking. Those initial values, with 8 bit resolution, are passed to the data file or RAM 400 by means of data register 402, ALU 408 and ALU register 406, and shifted to the eight most significant bit positions. That set-up procedure occurs for each field during the vertical blanking period.

Two lines prior to the first line of video, the instruction register 404 begins to read delta values from the convergence EPROM 302. Sixty-three increment values are read during each horizontal line and are added to the 63 values stored in the data file 400. Those 63 sums are stored in the data file 400, replacing the previously stored values. Thus, the data file 400 always contains the current value of the amplitude of the waveform.

The first set of 63 delta values are used for the first block of 16 horizontal lines. The address to the convergence EPROM 302 is then stepped to read a second set of 63 delta values that are to be used for the second block of 16 horizontal lines. The convergence EPROM 302 address is stepped 29 times after the initial block, for a total of 30 sets of delta values associated with 30 blocks of 16 horizontal lines. A total of 480 lines of data points are thus generated. Therefore, the waveform which began two lines before the first line of video will end three lines after the last line of video in each field. The ALU register 406, at the output of the ALU 408, presents data to the data file 400. It also presents the 8 most significant bits to the digital-to-analog converter 306, which generates the analog waveform sent to the convergence coil drivers 308 and 310 described above.

As was discussed in connection with FIG. 3, the circuitry shown in FIG. 4 and described hereinabove is repeated four times, one for each of the red, green, blue and lateral blue waveform generators. The operation of those four circuits occurs in parallel and is controlled by one common set of timing and logic circuits, to be described immediately hereinafter.

The signals inputted to the digital convergence timing and control logic shown in that portion of FIG. 4 not yet described, consist, as has been previously described, of a 9 MHz clock signal 202, a horizontal sync pulse 204 and a vertical sync pulse 206.

When a vertical sync pulse 206 is received, the instruction PROM 410 outputs through each instruction register 404, a command to load the vertical counter 412 with a predetermined address. When this address is presented to the instruction PROM 410, it will only cause the ALU 408 output to be zero. This is accomplished by the connection of the instruction PROM 410 through the instruction registers 404 and 405, to the ALU 408.

The zero output of the ALU 408 clears the contents of each of the data files 400. This action continues until the vertical sync pulse ends, at which time the setup sequence described above begins. That operational sequence was specifically designed to operate in that manner during the vertical sync period since that period is not always a fixed number of horizontal lines. The vertical sync period will thus be 5+1 horizontal periods, depending upon which field precedes it and whether a refresh channel resync has occurred.

After the setup sequence, the vertical counter 412 is cleared and the actual waveform generation then begins as previously described. The vertical counter is clocked once during each horizontal line. The five most significant bits make up part of the convergence PROM 302 address and all bits to the instruction PROM 410.

The horizontal counter 414, which is connected to receive both the 9 MHz clock signal 202 and the horizontal sync pulse 204, is cleared by synchronously loading zeros at the same time the vertical counter 412 is clocked. Thus, each horizontal sequence is begun coincident with the change of vertical address. The two least significant bits of the 8 bit horizontal counter 414 are used to generate clock pulses that strobe address and data registers 416 and 418 at the proper times in the horizontal sequence.

The six most significant bits of the horizontal counter 414 provide part of the convergence EPROM 302 address and also the address of the data file 400. That is accomplished by feeding the Q output of the horizontal counter 414 to the address buffer 416, whose output is connected to both the convergence EPROM 302 and the RAM address register 420 connected to the data file 400. Thus, the address of the convergence EPROM 302 and data file 400 change at a rate of 9 MHz divided by four, which equals 16 pixel positions on the raster. That provides 63 addresses for each horizontal line.

An important aspect of the operation of the convergence circuitry is the values stored in the convergence EPROM 302. It is those values, which, when summed with the corresponding data values stored in RAM 400, allow the color monitor of the present invention to produce a misconvergence characteristic of 0.012 inch. The values contained in the convergence EPROMs are calculated in accordance with a fourth-order polynomial equation for each sample point. That equation is:

$$F(X,Y) = A(BX^4 - CX^2)Y^2 + D(EX^3 - FX)Y^2 + GX^2 + H(X - X^2) + I(JY^4 - KY^2)X^2 + L(MY^3 - NY)X^2 + OY^2 + P(Y - Y^2) + QX^2Y^2 + R;$$

where: the center of the matrix is (0,0); and different major coefficients (for example, A and D), are used for each half or quarter of the matrix.

The foregoing equation replicates that used by analog convergence circuitry, but additionally adds two more orders of correction for more precise convergence values. The correction information stored in the EPROMs may be generated individually for each monitor by placing the monitor in a test set-up utilizing circuitry in addition to that shown in FIG. 2. Four RAMs are substituted for the four EPROMs 208, 210, 212 and 214 and the information contained therein, which is calculated in accordance with the above-described equation, is adjusted by an operator.

The operator uses predetermined adjustment points to generate the final convergence information to be stored in the RAMs. Twenty-nine points in a predetermined sequence are evaluated by an operator while a cross-hatched pattern appears on the screen. The convergence values are then adjusted until a satisfactory display is achieved.

Therefore, the information stored in the RAMs is dumped into the EPROMs for permanent storage and use with the individual monitor that was tested. Reference is also made herein to commonly assigned U.S. Pat. No. 4,631,576 and entitled: "Uniformity Correction for Color CRT Display," for additional information regarding the generation of the EPROM data. The contents of that application are incorporated herein as if fully set forth in its entirety.

There has thus been described a color television monitor in which a digital convergence circuit is used in order to generate a highly accurate and precise display. Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A color video monitor having a high resolution display, comprising:

means for amplifying an input video signal;
   means for producing color convergence signals including red convergence signals, blue convergence signals and green convergence signals;
   means connected to receive said color convergence signals for providing vertical deflection signals and convergence driver signals for said color video monitor;
   means connected to the vertical deflection means for providing horizontal deflection signals and dynamic focus signals for said color video monitor;
   a cathode ray tube; and
   means coupled to said cathode ray tube for receiving said color convergence signals, said vertical deflection signals, and said horizontal deflection signals for controlling the display on said cathode ray tube;
   said means for producing said color convergence signals including:
   first memory means for storing information for determining preliminary red convergence signals;
   second memory means for storing information for determining preliminary green convergence signals;
   third memory means for storing information for determining preliminary blue convergence signals;
   first interpolating means for interpolating between successive vertical portions of said red convergence signals and for providing digital red convergence signals such that a smooth convergence change between lines is achieved;
   second interpolating means for interpolating between successive vertical portions of said green convergence signals and for providing digital green convergence signals such that a smooth convergence change between lines is achieved;
   third interpolating means for interpolating between successive vertical portions of said blue convergence signals and for providing digital blue convergence signals such that a smooth convergence change between lines is achieved; and
   wherein said first memory means, said second memory means and said third memory means provided said preliminary convergence signals (f) according to a fourth-order polynomial expressions dependent upon X and Y where X is proportional to the horizontal location of the point of correction on the CRT and Y is proportional to the vertical location of the point of correction on the CRT.

2. The color video monitor of claim 1, wherein said means for producing color convergence signals comprises a plurality of:
   convergence means connected to the output of said interpolation means for converting said output from a digital signal to an analog signal; and
   filter means for smoothing said analog signal prior to its application to said means for providing the convergence driver function.

3. The color video monitor of claim 2, wherein a matrix of 63×480 convergence values are generated.

4. The color video monitor of claim 3, wherein 30 basic vertical convergence values and 480 lines of information are used such that each vertical convergence value is used to converge 16 lines of information.

5. The color video monitor of claim 2, wherein each of said plurality of interpolation, conversion and filter means is connected to a respective plurality of memory means, such that a separate one of said plurality of means for producing color convergence signals provides convergence functions for one of red, green, blue and lateral blue convergence signals.

6. A CRT display compensation system for correction of misconvergence, comprising:

means for storing correction signals for each of the red, green, blue and lateral blue convergence signals as a function of location on a screen of display, said correction signals (f) corresponding to a fourth order polynomial expression dependent upon X and Y where X is proportional to the horizontal location of the point of correction on the CRT and Y is proportional to the vertical location of the point of correction on the CRT;

means for interpolating said correction signals in order to produce a plurality of additional convergence signal values between said stored correction values to ensure smooth vertical convergence change between successive lines of said dispaly wherein a plurality of interpolation and conversion mean is connected after a respective plurality of memory means, such that a separate one of said plurality of interpolation and conversion means provides convergence functions for one of red, green, blue and lateral blue convergence signals; and means for converting the interpolated signals to analog form for application to the convergence coils used in the CRT.

7. The CRT compensation system of claim 6, further including smoothing filters connected to the output of the converting means.

8. The CRT compensation system of claim 6, where in a misconvergence value of 0.012 inch is achieved.

9. The CRT compensation system of claim 6, wherein a matrix of 63×480 convergence values are generated.

10. The CRT compensation system of claim 6, wherein 30 basic vertical convergence values and 480 lines of information are used such that each vertical convergence value is used to converge 16 lines of information.

11. The CRT compensation system of claim 1 wherein the fourth order polynomial expression comprises:

$$F(X,Y) = A(BX^4 - CX^2)Y^2 + D(EX^3 - FX)Y^2 +$$
$$GX^2 + H(X - X^2) + I(JY^4 - KY^2)X^2 + L(MY^3 - NY)X^2 +$$
$$OY^2 + P(Y - Y^2) + QX^2Y^2 + R;$$

wherein A, B, C, D, E, F, G, H, I, J, K, L, M, N, O, P, Q and R constants and where X is proportional to the horizontal location of the point of correction on the CRT and Y is proportional to the vertical location of the point of correction on the CRT.

12. A conveyance correction system for a multi-gun CRT comprising means for providing convergence correction signals (f) according to the following fourth order polynomial expression:

$$F(X,Y) = A(BX^4 - CX^2)Y^2 + D(EX^3 - FX)Y^2 +$$
$$GX^2 + H(X - X^2) + I(JY^4 - KY^2)X^2 + L(MY^3 - NY)X^2 +$$
$$OY^2 + P(Y - Y^2) + QX^2Y^2 + R;$$

wherein A, B, C, D, E, F, G, H, I, J, K, L, M, N, O, P, Q and R are constants and where X is proportional to the horizontal location of the point of correction on the CRT and Y is proportion to the vertical location of the point of correction on the CRT.

* * * * *